C. C. ROSS.
GANG LAWN MOWER.
APPLICATION FILED AUG. 10, 1920.
1,366,948.
Patented Feb. 1, 1921.
4 SHEETS—SHEET 2.
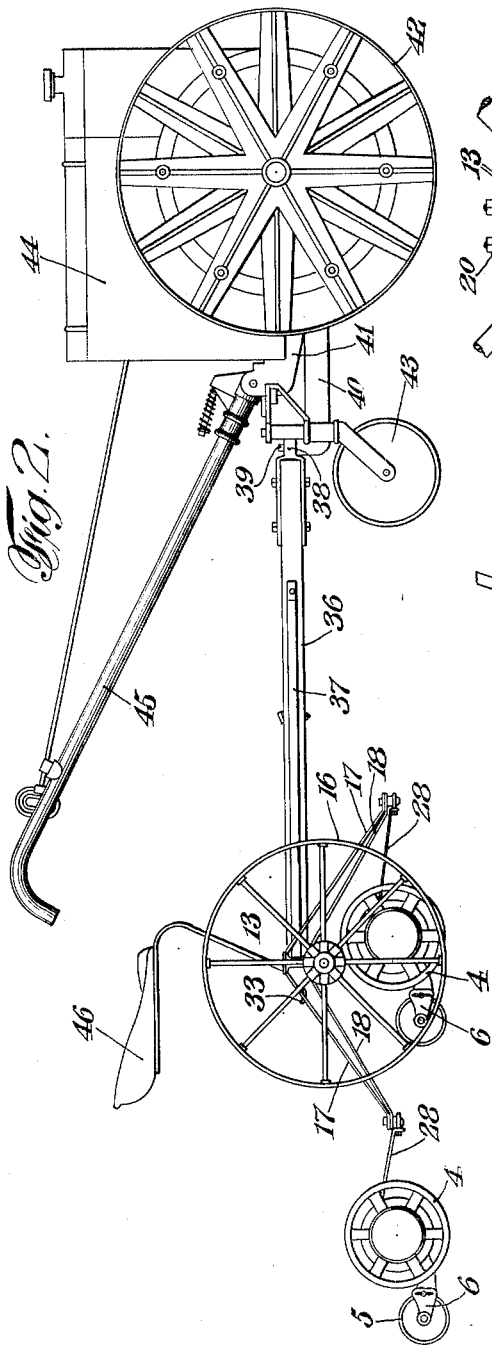
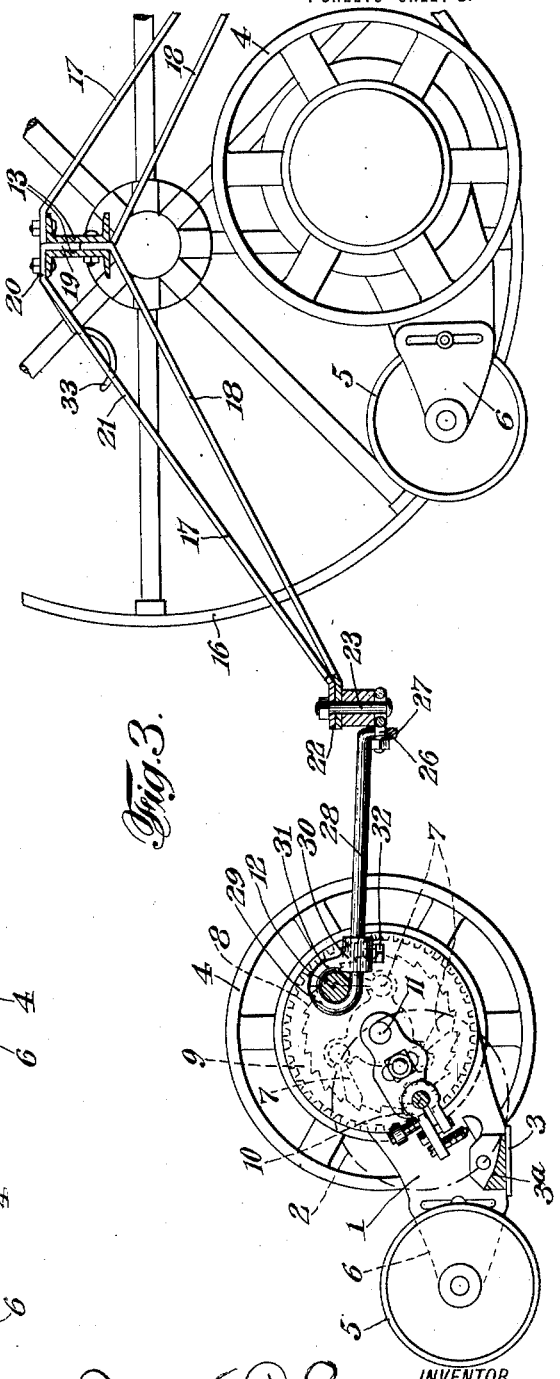
INVENTOR
Cleland C. Ross
BY
ATTORNEY

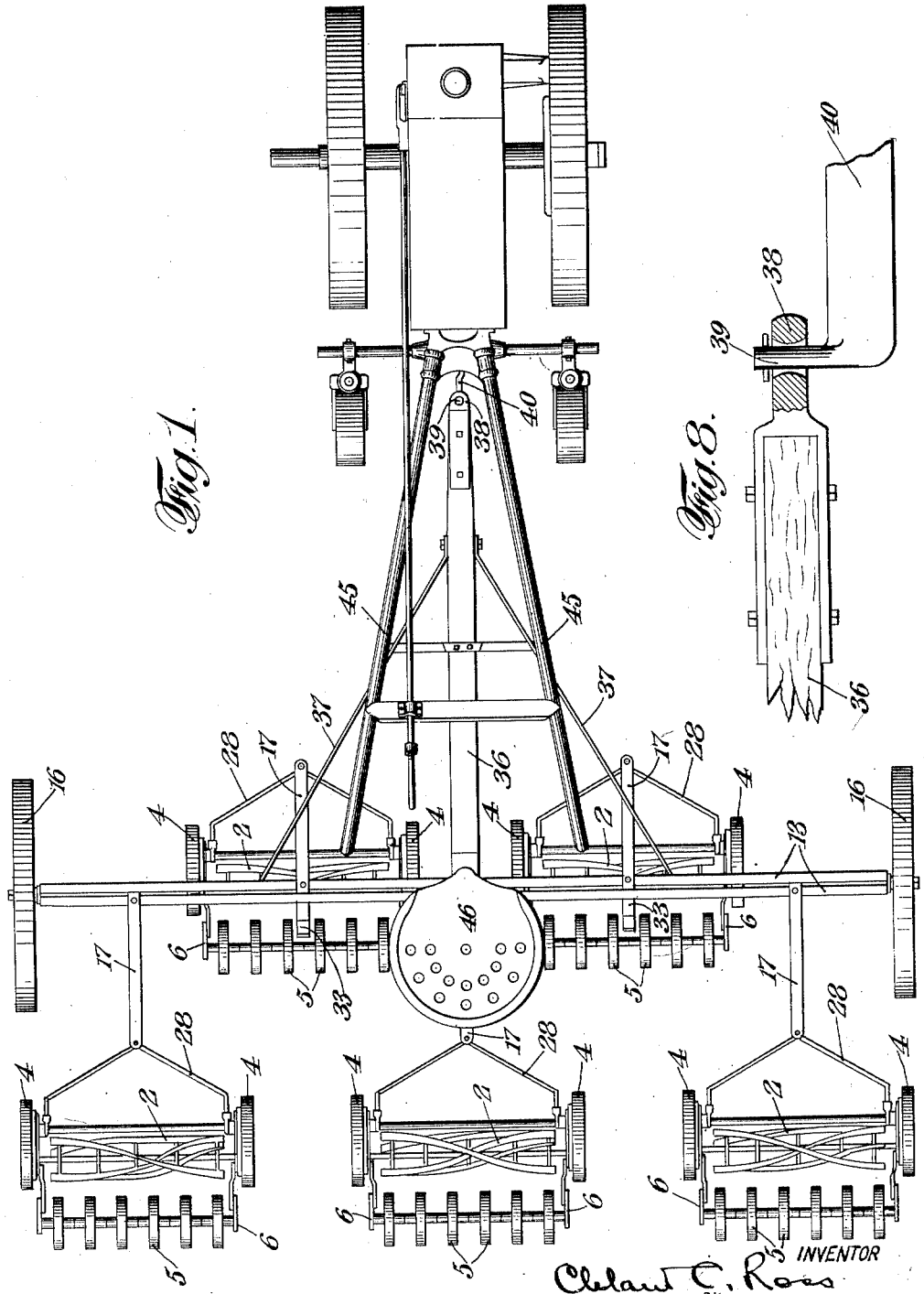

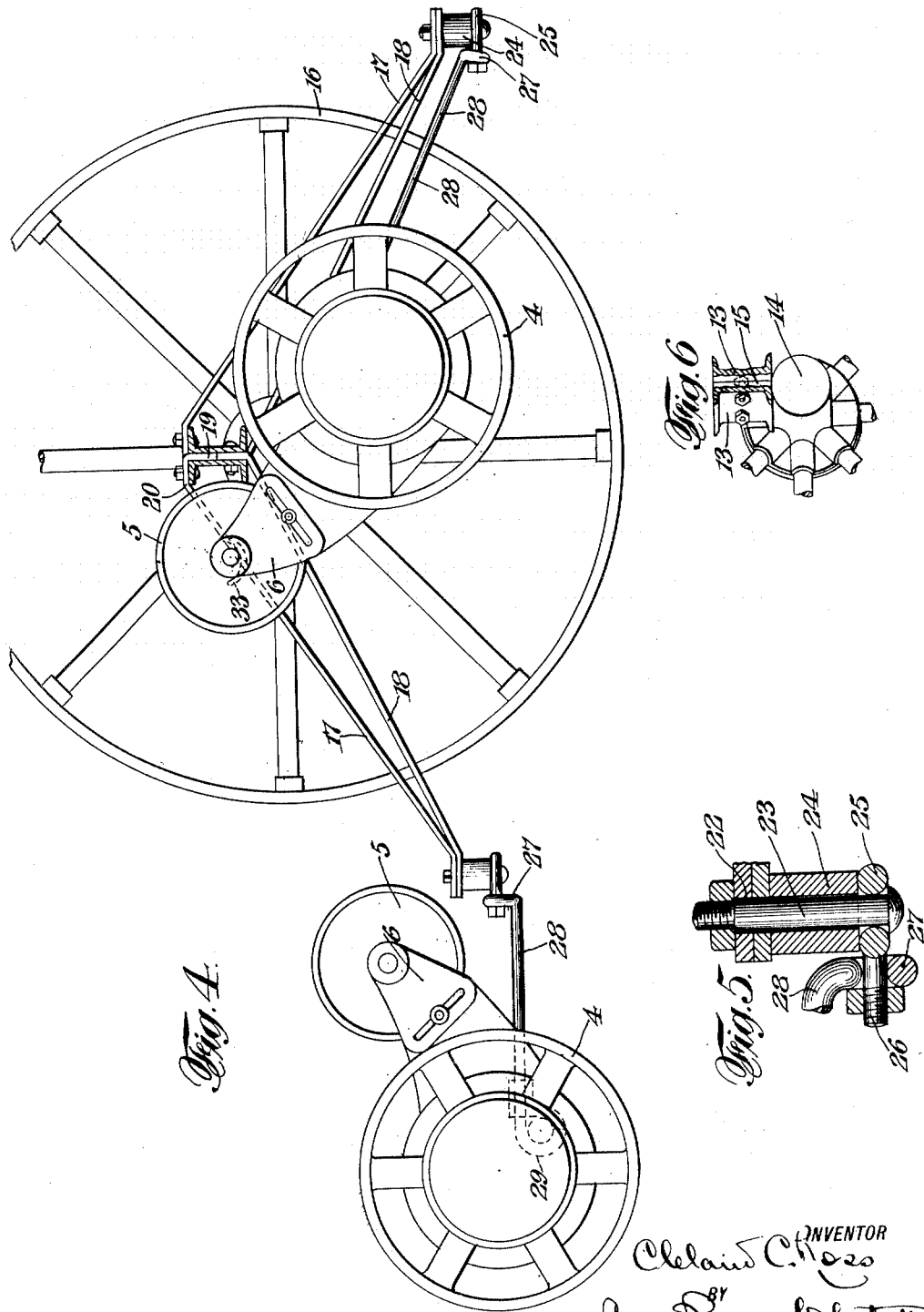

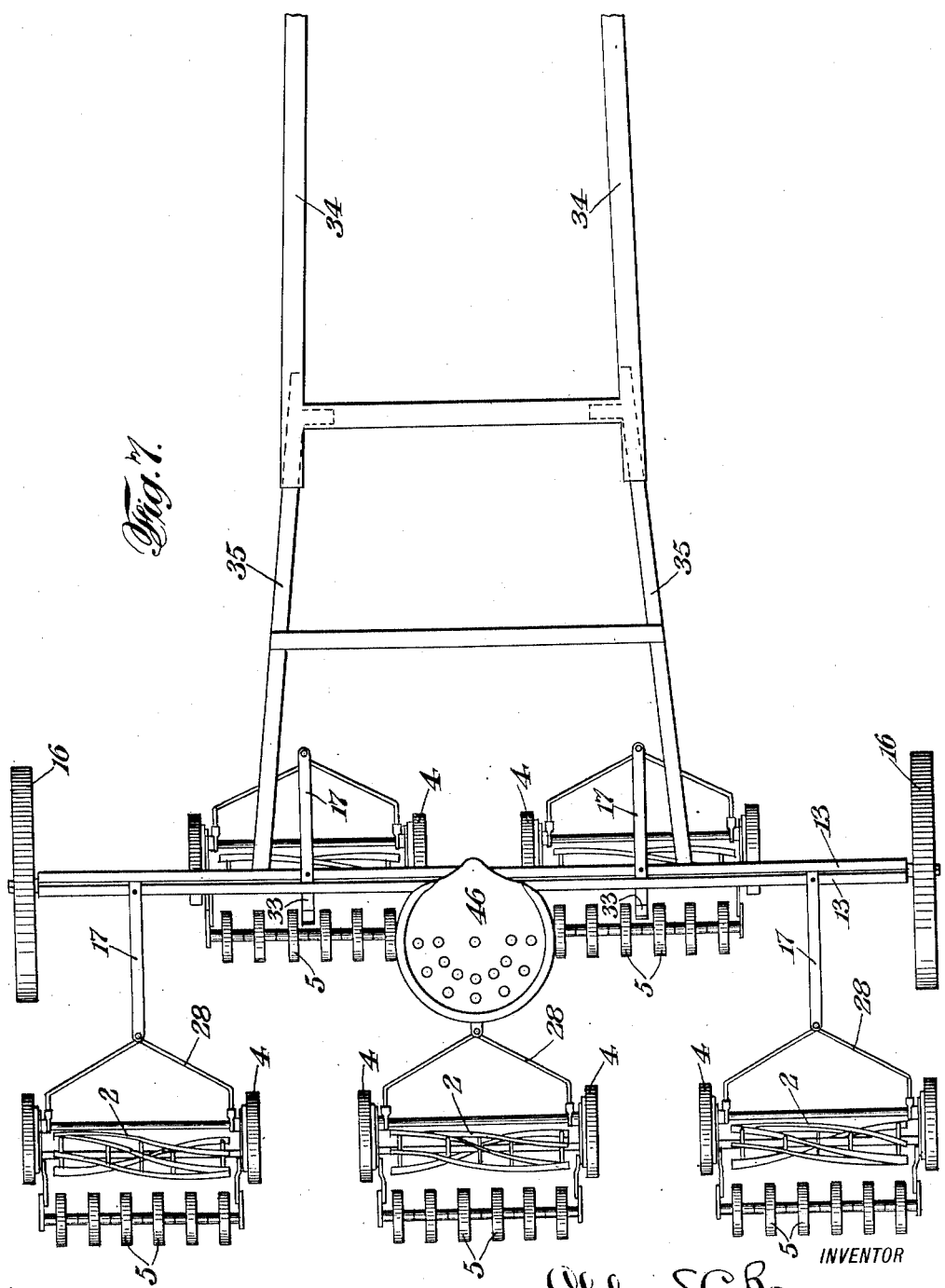

UNITED STATES PATENT OFFICE.

CLELAND COLDWELL ROSS, OF NEWBURGH, NEW YORK.

GANG LAWN-MOWER.

1,366,948.  Specification of Letters Patent.  Patented Feb. 1, 1921.

Application filed August 10, 1920. Serial No. 402,628.

*To all whom it may concern:*

Be it known that I, CLELAND COLDWELL ROSS, a citizen of the United States, residing at Newburgh, in the county of Orange and State of New York, have invented certain new and useful Improvements in Gang Lawn-Mowers; and I do hereby declare the following to be a full, clear, and exact description of the invention, such as will enable others skilled in the art to which it appertains to make and use the same.

My invention consists in the novel features hereinafter described, reference being had to the accompanying drawings which show one embodiment of my invention, selected by me for purposes of illustration, and the said invention is fully disclosed in the following description and claims.

My invention has for its object to provide a gang lawn mower of extremely light and inexpensive structure, in which the mower units employed may be and are preferably ordinary hand lawn mowers. In carrying out my invention I provide a draft frame of extremely light construction supported on its own wheels, independent of the mower units, and provided with draft arms to which the units are preferably connected so that they arrange themselves in a plurality of ranks. The draft arms extend to points closely adjacent to the ground where they are connected by universal swivel joints with draft bails, the latter being connected pivotally with the individual mower units so that there is a downward draft as the apparatus is propelled over the ground on each of the mower units, tending to increase, rather than decrease, the traction of their rotary ground engaging devices. It will be understood that each of the mower units being an ordinary hand lawn mower with handle removed, comprises a rotary cutter or wiper, a stationary cutting knife coöperating therewith, rotary ground engaging devices or traction wheels connected by suitable gearing, and the usual pawl and ratchet mechanism, with the rotary cutter for driving the same, and a rear roller or rollers supporting the cutting mechanism adjustably to regulate the height of cut. Permitted by the universal swivel connections between the draft arms and the draft bails, before referred to, the mower units of the rear rank can be turned upside down, thereby reversing the direction of rotation of their traction wheels and permitting idleness of the rotary cutter, when passing from one field to another, or driving over ground where it is not desired to cut. While in this position, a portion of the frame of the mower unit carrying the cutting mechanism can also be lifted out by contact with the ground and swung over on top of the draft bail, thereby elevating the cutting mechanism to a greater elevation above the ground where it is not likely to be injured by striking against a stone or other obstruction in propelling the machine without cutting. The mower units of the front rank may also be turned over in the same way if a sufficient distance is allowed between them and the draft frame, which latter may be given an arched form at points above the front rank units, if this is deemed desirable. Where there is not sufficient room between the frame bar and the front rank units to permit them to be inverted, I may provide the frame bar with hooks or supporting brackets upon which the entire weight of the units of the front rank may be supported when the machine is being propelled without cutting. In the preferred form of my improved apparatus the frame bar is provided with a draft bar rigidly connected therewith, and pivotally connected to a tractor mechanism supported upon its own traction wheels and provided with steering arms extending to a point adjacent to a driver's seat supported on the frame bar so that the operator from said seat can steer the tractor and thereby direct the movements of the gang mower propelled thereby, by exerting a sidewise pressure on the steering handles of the tractor. My invention also contemplates certain details of construction and arrangement of parts, all of which are hereinafter described and particularly pointed out in the claims.

Referring to the accompanying drawings which illustrate one embodiment of my invention selected by me for purposes of illustration, Figure 1 represents a top plan view of my improved gang lawn mower operatively connected with the tractor propelling mechanism therefor.

Fig. 2 is a side elevation of the same,

Fig. 3 is an enlarged longitudinal sectional view of the gang lawn mower, parts being broken away.

Fig. 4 is a view similar to Fig. 3 showing the mower of the rear rank inverted and the cutting mechanism thrown forward onto the draft bail, and a mower of the front rank carried out of contact with the ground upon a supporting hook or bracket secured to the draft frame.

Fig. 5 is an enlarged detail sectional view of the universal swivel joint connecting the draft arms and the draft bails.

Fig. 6 is a detail perspective view of a portion of the draft frame and one of the axles therefor.

Fig. 7 is a plan view of the gang lawn mower provided with shafts for operation by a draft animal.

Fig. 8 is a detail view of the pivotal connection between the draft frame and the tractor frame.

In carrying out my invention, as before stated, I prefer to employ as the mower units, of which there may be two, three, five, or more, an ordinary hand lawn mower such as has been usually pushed over the lawn by hand. I prefer to employ five mower units, as shown in the drawings, and to arrange them in two ranks, two mowers being arranged in the front rank and three in the rear rank, in such manner that they will cut a very wide swath, the paths traversed by the mower units of the rear rank slightly overlapping the edges of the paths traversed by the mower units of the front rank, as will be readily understood. Each of these mower units comprises side frames 1, carrying a rotary cutter, indicated at 2, and a stationary knife, indicated at 3, rigidly connected to a stationary knife bar 3ª, the said frames being supported at the front end by traction wheels 4 and at the rear end by a rear roller or rollers 5, carried by hangers 6, adjustably secured to the rear portions of the side frames so that by the vertical adjustments of the hangers, the distance between the stationary knife 3 and the ground, and therefore the height of the cut, can be varied. The traction wheels 4 are connected with a rotary cutter in any desired and well known manner through gearing and pawl and ratchet mechanism, so that as the traction wheels are drawn forward, when the mower is in normal position, rotary motion will be imparted to the rotary cutter, but when the traction wheels are rotated in the opposite direction, the rotary cutter will be permitted to stand still. In this instance I have shown the traction wheels provided with pawls, indicated at 7, engaging ratchet teeth 8 on a gear wheel 9 provided with an internal gear in mesh with a pinion 10 on the shaft of the rotary cutter, as indicated in Fig. 3, but I do not limit myself to this exact arrangement.

Obviously the side frames are pivotally connected through the traction wheels to the axles, indicated at 11, so that the rear portion of the side frames can be raised out of contact with the ground, if desired. The side frames are connected by suitable transverse bars or tierods, one of which is indicated at 12, which, together with the stationary knife bar 3ª, impart sufficient rigidity to the mower frame. It will be understood that each of the mower units is constructed ordinarily in exactly the same or equivalent manner as before described.

In order to relieve the mower units from any superimposed weight, I provide a special draft frame, which consists in this instance of a pair of light channel bars 13, having their flanges extending respectively forwardly and rearwardly and their webs suitably connected by bolts. On each end of the channel bars is a stub axle, one of which is shown in Fig. 6, indicated at 14, provided with a web portion 15 extending between the webs of the channel bars and bolted thereto and upon each of said axles is secured a supporting wheel 16. The channel bars are also provided with a plurality of draft arms equal in number to the number of mower units, certain of said draft arms extending forwardly and others rearwardly from the channel bars, and all of said arms extending in a downward direction. Each of these draft arms is preferably formed of two bars 17, 18, the bar 17 having a flange portion 19 extending between the webs of the channel bars, and the portion 20 extending over the top flange of one of the channel bars and secured thereto by means of a bolt. The other bar 18 has a flange extending between the webs of the channel bars, and the ends of the bars 17, 18 are preferably united and provided with an eye or pivot aperture, indicated at 22. The ends of the bars 17, 18 adjacent to the eye 22 may be united by welding or by riveting, or otherwise, and these bars form a very rigid and satisfactory draft arm, which is secured to the channel bars both by the connecting bolts before referred to, and by the engagement of the flanges between the webs of the channel bars, which are firmly clamped by the bolts, uniting the channel bars. The forwardly extending draft arms are connected to the mower units of the front rank and the rearwardly extending draft arms are connected to the mower units of the rear rank by means of universal swivel connections, one of which is illustrated in detail in Fig. 5. These connections comprise a vertically disposed pivot bolt 23, which passes through the eye 22 in the draft bar and through a washer 24 and through the horizontal eye 25 of an eye bolt 26, which latter engages a vertical eye 27 at the forward end of a draft bail 28 having at its rear end a pivotal connection with the side frames of one of the mower units, and preferably engaging, pivotally, one of the tierods 12, as shown. I prefer to make this bail of one piece of rod, the central portion of which is bent into the form of an eye, and then bent downwardly to form the vertically disposed eye 27. Each end of the bail is provided with a curved hook portion, indicated at 29, to engage the tierod 12, for example, as shown in Fig. 3, and the bail is preferably detachably secured to the tierod by means of a slide 30 mounted on each arm of the bail and provided with a curved arm 31 which passes around the tierod in a direction opposite to that of the hook portion 29, as clearly shown in Fig. 3. The slide is provided with a set screw 32, by means of which it can be locked on the arm of the bail 28 in operative position. It is obvious that any one of the mower units can be readily detached from the gang apparatus when desired, by loosening the set screws 32 of the draft bail and moving the slides 30 forward, thereby permitting the hook portions 29 to disengage the tierods 12. It will also be noted that the eye bolt 26 to which the bail is directly connected, occupies a position nearer the ground than the tierod 12, so that the bail 28 extends forwardly and in a slightly downward direction. It follows from this construction that the draft on each mower unit, as the gang mower is propelled over the ground, is in a forward and a downward direction, which tends to increase rather than decrease the traction of the traction wheels 4.

It will be seen that by reason of the peculiar construction of the universal swivel connection provided by the vertical pivot 23 and the horizontal eye bolt 26, each mower unit is free to rock transversely on the eye bolt 26, and also to trail and change its position angularly with respect to the draft arm, if the machine is drawn forward in a curved path. The connection between the eye bolt and the vertically disposed eye 27 is also sufficiently loose to allow the mower units to rise and fall slightly in passing over uneven ground independently of each other and of the draft frame and draft arms, the bails 28 having a pivotal connection with the tierod 12, as before described.

It will also be seen that the mower units of the rear rank can be turned upside down on the eye bolt 26, as an axis, as indicated in Fig. 4, which will cause the traction wheels 4 to rotate in the opposite direction from their normal direction of rotation, thus permitting the rotary cutter to remain stationary and the side frames carrying the cutter mechanism can also be rotated forwardly to a position in front of the axles of the traction wheels 4, as indicated in Fig. 4, in which position they will be supported by the engagement of the rear rollers 5 or the axle thereof with the bail 28, thus supporting the cutting mechanism at a considerable elevation above the ground, in which position it is not likely to be injured by contact with stones, etc., in moving the machine from one field to another, or along a roadway where cutting is not desired. The mowers of the front rank can likewise be inverted and rocked forwardly, if sufficient space is provided between them and the channel bars, which in some instances may be given an arched construction, as will be readily understood for this purpose, but I find it convenient, in order to use smaller supporting wheels 16 for the draft frame, to provide the draft frame with supporting hooks or brackets 33, to receive the axles of the rear rollers of the front rank mower units when the latter are lifted clear of the ground, as indicated in Fig. 4. This not only elevates the cutting mechanism of the front rank units out of dangerous proximity to the ground, but will also support the entire weight of the front units and transfer it to the supporting wheels 16 of the draft frame, thus facilitating the transportation of the machine from one point to another, without cutting.

Where the machine is to be drawn by one or more draft animals, the draft apparatus indicated in Fig. 7, as a pair of shafts 34, is rigidly connected by means of bars 35 with the channel bars. I prefer, however, to propel the gang mower structure by means of a tractor, and to this end I prefer to provide the channel bars, as shown in Fig. 1, with a forwardly extending draft bar 36 connected at its rear end to the channel bars and braced by suitable brace bars 37, the forward end of the draft bar being pivotally connected at 38 to a vertically disposed draft bolt 39 on a bracket 40 secured to the frame 41 of a tractor, and carried by traction wheels 42 and caster wheels 43, the latter being located adjacent to the pivotal connection 38—39. The pivotal connection 38—39 is a loose connection, that is to say, the forward end of the draft bar is provided with an eye 38 which loosely engages the vertical pivot 39 so as to permit the draft frame of the gang mower and the frame of the tractor to rock longitudinally, as well as transversely, with respect to each other to accommodate themselves to inequalities of the ground without interfering the one with the other. The tractor frame is provided with a suitable motor, indicated at 44, which drives the tractor wheels 42 by means not specifically shown and described herein, as the same are well known. The tractor frame is also provided with rearwardly projecting steering handles, indicated at 45, the rear ends of which are located adjacent to and above the channel bars of the gang mower draft frame and adjacent to a driver's seat, indicated at 46, supported by and connected to said channel bars. Carried by said handle bars are the necessary devices for controlling the motor of the tractor, the details of which form no part of the present invention and need not be particularly described. It will be seen that the operator seated on the driver's seat can steer the tractor and the gang mower by moving the steering handles laterally, by reason of the caster wheels located at the rear of the tractor frame, and the pivotal connection 38—39 before described between the tractor frame and the draft bar 36 of the gang mower.

What I claim and desire to secure by Letters Patent is:—

1. In a gang lawn mower, the combination with a plurality of mower units, each provided with cutting mechanism and traction devices for operating the same, of a draft frame disposed transversely to the line of draft, wheels independent of the mower units supporting said frames, draft arms rigidly connected to said frame, each of said draft arms being connected to one of said mower units, a driver's seat supported by said frame, a draft appliance connected to said frame, a tractor frame, independent supporting wheels therefor, a pivotal connection between said draft appliance and the tractor frame, and a steering handle connected to the tractor frame and extending to a point adjacent to the driver's seat.

2. In a gang lawn mower, the combination with a plurality of mower units, each provided with cutting mechanism and traction devices for operating the same, of a draft frame disposed transversely to the line of draft, wheels independent of the mower units supporting said frames, draft arms rigidly connected to said frame, each of said draft arms being connected to one of said mower units, a driver's seat supported by said frame, a draft appliance connected to said frame, a tractor frame, independent supporting wheels therefor, including caster wheels, a loose pivotal connection having a vertical axis, between said draft appliance and the tractor frame permitting said frames to rock transversely with respect to each other, and a steering handle connected rigidly to the tractor frame, and extending to a point adjacent to the driver's seat.

3. In a gang lawn mower, the combination with a plurality of mower units, each provided with cutting mechanism and traction devices for operating the same, of a draft frame disposed transversely to the line of draft, wheels independent of the mower units supporting said frames, draft arms rigidly connected to said frame, each of said draft arms being connected to one of said mower units, a driver's seat supported by said frame, a draft appliance connected to said frame, a tractor frame, independent supporting wheels therefor, including main supporting and traction wheels, and caster wheels located in rear thereof, a loose pivotal connection between the said draft appliance and the tractor frame, and a steering handle rigidly secured to the tractor frame adjacent to the caster wheels and extending to a point adjacent to the driver's seat.

4. In a gang lawn mower, the combination with a plurality of mower units, each provided with cutting mechanism and traction devices for operating the same, of a draft frame disposed transversely to the line of draft, wheels independent of the mower units for supporting said frame, draft arms rigidly connected to said frame, certain of said draft arms extending forwardly of the draft frame, and others extending rearwardly therefrom, and connections between each of said draft arms and one of said mower units for propelling the mower units over the ground, said connections permitting the mower units to accommodate themselves independently to the ground surface and said draft arms maintaining said units at all times in separated relation longitudinally and transversely of the machine.

5. In a gang lawn mower, the combination with a plurality of mower units, each provided with cutting mechanism and traction devices for operating the same, of a draft frame disposed transversely to the line of draft, wheels independent of the mower units for supporting said frame, draft arms rigidly connected to said frame, certain of said draft arms extending forwardly of the draft frame, and others extending rearwardly therefrom, a draft bail connected to each of said mower units by pivotal connections having a horizontal axis, each of said bails being connected to one of said draft arms by a pivotal connection having a vertical axis, the pivotal connection with the draft arm being lower than the pivotal connections with the mower unit, whereby the draft on the mower units is applied in a downward direction.

6. In a gang lawn mover, the combination with a plurality of mower units, each provided with cutting mechanism and traction devices for operating the same, of a draft frame disposed transversely to the line of draft, wheels independent of the mower units for supporting said frame, draft arms rigidly connected to said frame, certain of said draft arms extending forwardly of the draft frame, and others extending rearwardly therefrom, a draft bail connected to each of said mower units by pivotal connections having horizontal axes, each of said bails being connected to one of said draft arms by a pivotal connection, permitting the mower units to assume different angular positions with respect to the draft arms, to rise and fall with respect thereto, and to rock transversely.

7. In a gang lawn mower, the combination with a plurality of mower units, each provided with cutting mechanism and traction devices for operating the same, of a draft frame disposed transversely to the line of draft, wheels independent of the mower units for supporting said frame, draft arms rigidly connected to said frame, certain of said draft arms extending forwardly of the draft frame, and others extending rearwardly therefrom, a draft bail connected to each of said mower units by pivotal connections having horizontal axes, and a pivotal connection between each bail and one of said draft arms provided with vertical and horizontal axes.

8. In a gang lawn mower, the combination with a plurality of mower units, each provided with cutting mechanism and traction devices for operating the same, of a draft frame disposed transversely to the line of draft, wheels independent of the mower units for supporting said frame, draft arms rigidly connected to said frame, certain of said draft arms extending forwardly of the draft frame, and others extending rearwardly therefrom, a draft bail for each of said mower units provided at its rear end with hook portions for pivotally engaging a portion of the mower frame, sliding blocks on said bail provided with means for preventing the instantaneous disengagement of said hook portions, and means for securing said blocks in operative position, and a loose pivotal connection between each of said bails and one of said draft arms.

9. In a gang lawn mower, the combination with a plurality of mower units, each provided with cutting mechanism and traction devices for operating the same, of a draft frame disposed transversely to the line of draft, wheels independent of the mower units for supporting said frame, draft arms rigidly connected to said frame, certain of said draft arms extending forwardly of the draft frame, and others extending rearwardly therefrom, a draft bail for each mower unit having at its rear end pivotal connections with the mower unit provided with horizontal axes, and having at its forward end a vertically disposed eye, and connections between each of said bails and one of said draft arms including a member having a horizontal pivotal axis engaging said eye, said member being connected to the adjacent draft arm by a pivotal connection having a vertical axis.

10. In a gang lawn mower, the combination with a plurality of mower units, each provided with cutting mechanism, traction devices for operating the same, and gear connections between the cutting mechanism and rotary traction devices operative only when the traction devices are rotated in one direction, of a draft frame, wheels independent of the mower units for supporting said frame, draft arms rigidly connected with said frame, and swivel connections between the mower units and said draft arms permitting the mower units to be inverted to reverse the direction of rotation of the rotary traction devices and permitting the cutting mechanism to remain in inoperative condition.

11. In a gang lawn mower, the combination with a plurality of mower units, each provided with cutting mechanism traction devices for operating the same, and gear connections between the cutting mechanism and rotary traction devices operative only when the traction devices are rotated in one direction, of a draft frame, wheels independent of the mower units for supporting said frame, draft arms rigidly connected with said frame, a draft bail secured to each of said mower units by pivotal connections having horizontal axes and connected to one of said draft arms by a pivotal connection having a horizontal axis, extending longitudinally of the machine, and permitting the mower unit to be inverted to reverse the direction of rotation of its rotary traction devices.

12. In a gang lawn mower, the combination with a plurality of mower units each provided with side frames, cutting mechanism carried thereby, traction wheels supporting said side frames, gear connections between said traction wheels and the cutting mechanism operative only when the said wheels are moved in one direction, and rotary devices carried by the side frames for regulating the height of cut, a draft frame, independent supporting wheels therefor, draft arms rigidly connected to said draft frame, a draft bail connected to each of said mower units by pivotal connections having horizontal axes, said draft bails being connected to said draft arms by pivotal connections, permitting the mower unit to be inverted, whereby the direction of rotation of the traction wheels may be reversed and the side frames may be swung over upon and supported by the bail.

13. In a gang lawn mower, the combination with a plurality of mower units, each provided with cutting mechanism traction devices for operating the same, and gear connections between the traction devices and cutting mechanism operative when the traction devices are rotated in one direction only, a draft frame extending transversely of the line of draft wheels independent of the mower units for supporting said frame, draft arms rigidly connected to said frame, certain of said draft arms extending forwardly of the draft frame, and others extending rearwardly therefrom, a draft bail connected to each of said mower units by pivotal connections having horizontal axes, each of said bails being connected to one of the draft arms by loose universal connections, and supporting brackets on the draft frame above the mower units connected to the forwardly extending draft arms for engaging said mower units and supporting the entire weight of the same, out of contact with the ground.

In testimony whereof I affix my signature.

CLELAND COLDWELL ROSS.